United States Patent
Rhodes (10) Patent No.: US 12,442,350 B2
(45) Date of Patent: Oct. 14, 2025

(54) SMALL SATELLITE PROPULSION SYSTEM UTILIZING LIQUID PROPELLANT ULLAGE VAPOR

(71) Applicant: The Aerospace Corporation, El Segundo, CA (US)

(72) Inventor: Brandie L Rhodes, Redondo Beach, CA (US)

(73) Assignee: THE AEROSPACE CORPORATION, El Segundo, CA (US)

(*) Notice: Subject to any disclaimer, the term of this patent is extended or adjusted under 35 U.S.C. 154(b) by 1365 days.

(21) Appl. No.: 15/184,854

(22) Filed: Jun. 16, 2016

(65) Prior Publication Data
US 2017/0363044 A1 Dec. 21, 2017

(51) Int. Cl.
| | | |
|---|---|---|
| F02K 9/68 | (2006.01) | |
| F02K 9/42 | (2006.01) | |
| F02K 9/54 | (2006.01) | |
| F02K 9/58 | (2006.01) | |
| F02K 9/60 | (2006.01) | |

(52) U.S. Cl.
CPC ............... *F02K 9/58* (2013.01); *F02K 9/425* (2013.01); *F02K 9/54* (2013.01); *F02K 9/605* (2013.01); *F02K 9/68* (2013.01)

(58) Field of Classification Search
CPC ... F02K 9/605; F02K 9/68; F02K 9/50; F03H 1/00–0093; B64G 1/402
See application file for complete search history.

(56) References Cited

U.S. PATENT DOCUMENTS

| | | | | |
|---|---|---|---|---|
| 3,486,302 A | * | 12/1969 | Paynter | F02K 9/605 |
| | | | | 55/431 |
| 8,596,038 B2 | * | 12/2013 | Yamamoto | B64G 1/402 |
| | | | | 60/257 |
| 2004/0244356 A1 | | 12/2004 | Ronney | |
| 2009/0297999 A1 | * | 12/2009 | Jensen | F23Q 11/00 |
| | | | | 431/268 |
| 2013/0026920 A1 | * | 1/2013 | Szabo, Jr. | F03H 1/0012 |
| | | | | 315/111.41 |
| 2013/0048097 A1 | * | 2/2013 | Mungas | F02K 9/44 |
| | | | | 137/13 |
| 2013/0196273 A1 | * | 8/2013 | Mungas | F02K 9/50 |
| | | | | 431/11 |

OTHER PUBLICATIONS

Zakirov "An Update on Surrey Nitrous Oxide Catalytic Decomposition Research" (Year: 2001).*
Lohner "Design and Development of a Sub-Scale Nitrous Oxide Monopropellant Gas Generator" (Year: 2007).*
Ochoa "Thermal Transpiration Based Microscale Propulsion and Power Generation Devices" (Year: 2003).*

(Continued)

*Primary Examiner* — Gerald L Sung
(74) *Attorney, Agent, or Firm* — LeonardPatel PC (57) ABSTRACT

A novel approach provides a small satellite propulsion system that uses vapor to generate thrust for the small satellite. The vapor naturally sits on top of liquid propellant (s), which are stored within a propellant tank. The vapor may flow from the propellant tank and through a membrane to interact with a reacting surface to generate thrust.

24 Claims, 8 Drawing Sheets

(56) References Cited

OTHER PUBLICATIONS

Zakirov "Surrey Research on Nitrous Oxide Catalytic Decomposition for Space Applications" (Year: 2000).*
Whitehead "Hydrogen Peroxide Propulsion for Smaller Satellites", 12th Annual American Institute of Aeronautics and Astronautics, (Year: 1998).*
David "Ion Propulsion Technology: NASA's Evolutionary Xenon Thruster (NEXT) Development and Long Duration Tests Results and its Applications." (Year: 2020).*
Cardin "A Cold Gas Micro-Propulsion System for CubeSats" (Year: 2003).*
Abbott, et al., "The Monopropellant Isopropyl Nitrate: Its Characteristics and Uses, and Possible Future Applications", AIAA / SAE / ASME 16th Joint Propulsion Conference, Jun. 30-Jul. 2, 1980, Hartford, CT.
Boyer, et al., "Characteristics of Nitromethane for Propulsion Applications", 44th AIAA Aerospace Sciences Meeting and Exhibit, Jan. 9-12, 2006, Reno, NV.
Cardin, et al., "A Cold Gas Micro-Propulsion System for CubeSats", 17th Annual AIAA/USU Conference on Small Satellites.
Pahl, et al., "Design, Test, and Validation of a Refrigerant-Based Cold-Gas Propulsion System for Small Satellites", 24th Annual AIAA/USU Conference on Small Satellites.
Seubert, Carl Reiner, "Refrigerant-Based Propulsion System for Small Spacecraft", Masters Thesis, 2007.
Yarnot, et al., "Monopropellant Hydrazine Thrusters—Bringing Updated Designs to Flight", 52nd AIAA/SAE/ASEE Joint Propulsion Conference, AIAA Propulsion and Energy Forum, Jul. 25-27, Salt Lake City, UT.
Zeng, et al., "Thermal Transpiration Based Pumping and Power Generation Devices", Journal of Thermal Science and Technology, vol. 8, No. 2, 2013.

* cited by examiner

SMALL SATELLITE PROPULSION SYSTEM UTILIZING LIQUID PROPELLANT ULLAGE VAPOR

FIELD

The present invention generally pertains to a small satellite propulsion system, and more specifically, a propulsion system that generates thrust for a small satellite using natural vapor from stored liquid propellant.

BACKGROUND

A typical chemical thruster provides liquid propellant to an injector where the propellant is effectively sprayed into a combustion chamber to generate thrust. In such a design, a pressurizing gas is typically used to force the liquid propellant through to the injector. In other words, in addition to the liquid propellant, a gas is required. This gas is stored in a tank classified as a pressure vessel. The pressure vessel is generally a safety concern and can make obtaining a launch slot for a small satellite more difficult.

Accordingly, an improved approach to provide thrust for a small satellite may be beneficial.

SUMMARY

Certain embodiments of the present invention may be implemented and provide solutions to the problems and needs in the art that have not yet been fully solved by conventional small satellite propulsion systems. For example, some embodiments of the present invention generally pertain to a small satellite propulsion system that uses vapor pressure that naturally sits on top of liquid propellant to generate thrust in a small satellite.

In one embodiment, an apparatus includes vapor that naturally sits on top of liquid propellant stored within a propellant tank. The vapor flows from the propellant tank through a membrane, which is used for metering flow, to interact with a reacting surface to generate thrust.

In another embodiment, an apparatus may include a propellant tank and a valve. The propellant tank includes vapor that naturally sits on top of liquid propellant. The valve, when open, causes the vapor to flow from the propellant tank and through a membrane to interact with a reacting surface to generate thrust.

In yet another embodiment, an apparatus includes a first propellant tank comprising vapor that naturally sits on top of liquid propellants, and a second propellant tank comprising a second propellant. The vapor and the second propellant is mixed prior to passing through a membrane.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

Some embodiments generally pertain to a novel small satellite propulsion system (hereinafter "propulsion system"). The propulsion system may use natural vapor (or gas) from liquid propellant(s), a membrane, and a reacting surface to generate thrust in a small satellite. The thrust may be on the order of milli-Newtons to Newtons. The membrane in some embodiments may use small pores or tubes to meter the flowrate of the vapor and/or create additional pressure (e.g., as would be the case for a thermal transpiration membrane).

In some embodiments, this propulsion system may not substantially add to the system requirements of the small satellite. More specifically, the propulsion system may not dictate the design of the small satellite. Furthermore, the propulsion system takes into account that the small satellites are generally not the primary payload on a launch vehicle and are designed to abide by the launch vehicle code. Because small satellites are small in nature, e.g., 10 cm by 10 cm, the propulsion system in certain embodiments may not encompass a majority of the real estate on the small satellite.

Figure 1A:
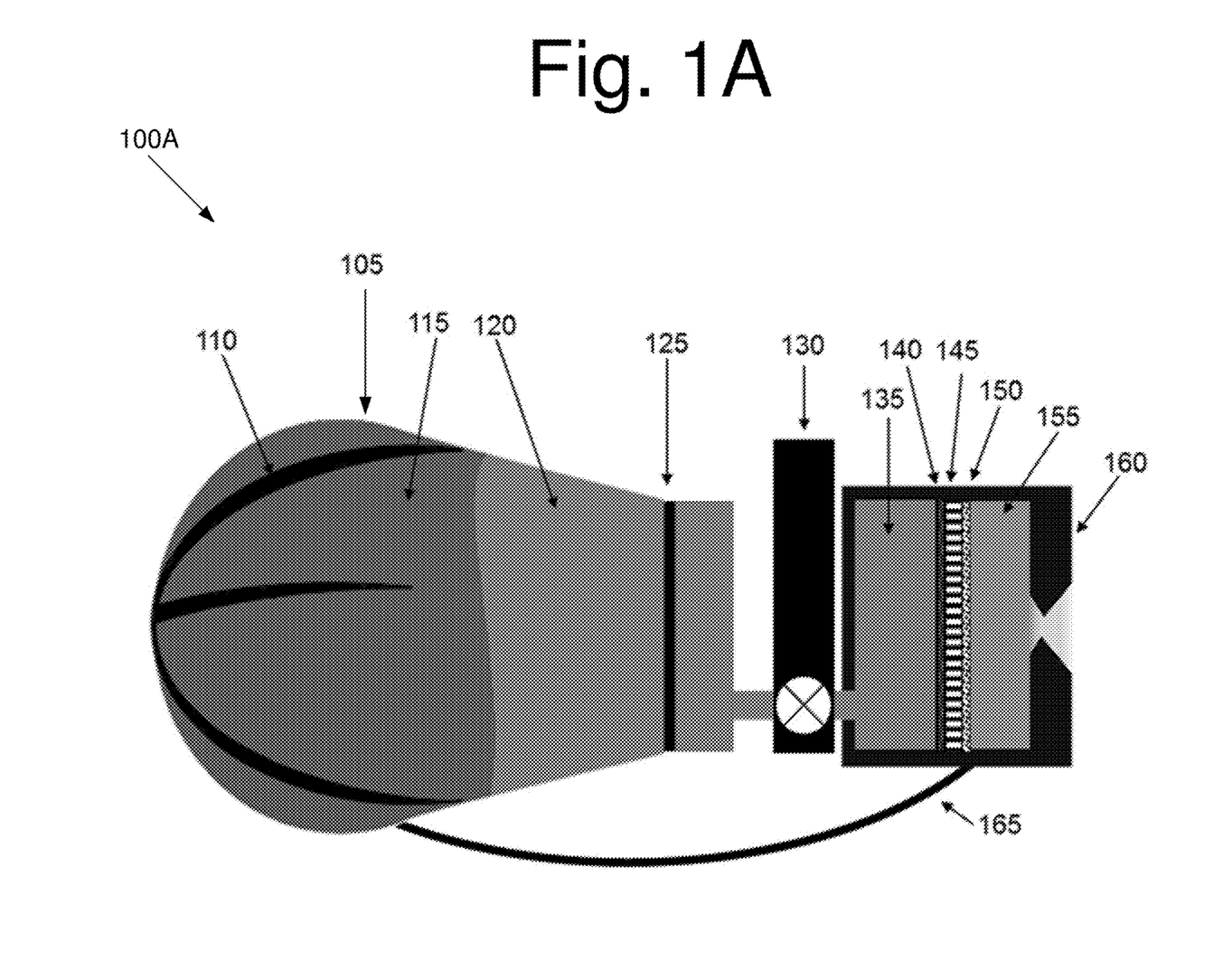
FIGS. 1A and 1B are diagrams illustrating a small satellite propulsion system, according to an embodiment of the present invention.
Figure 1B:
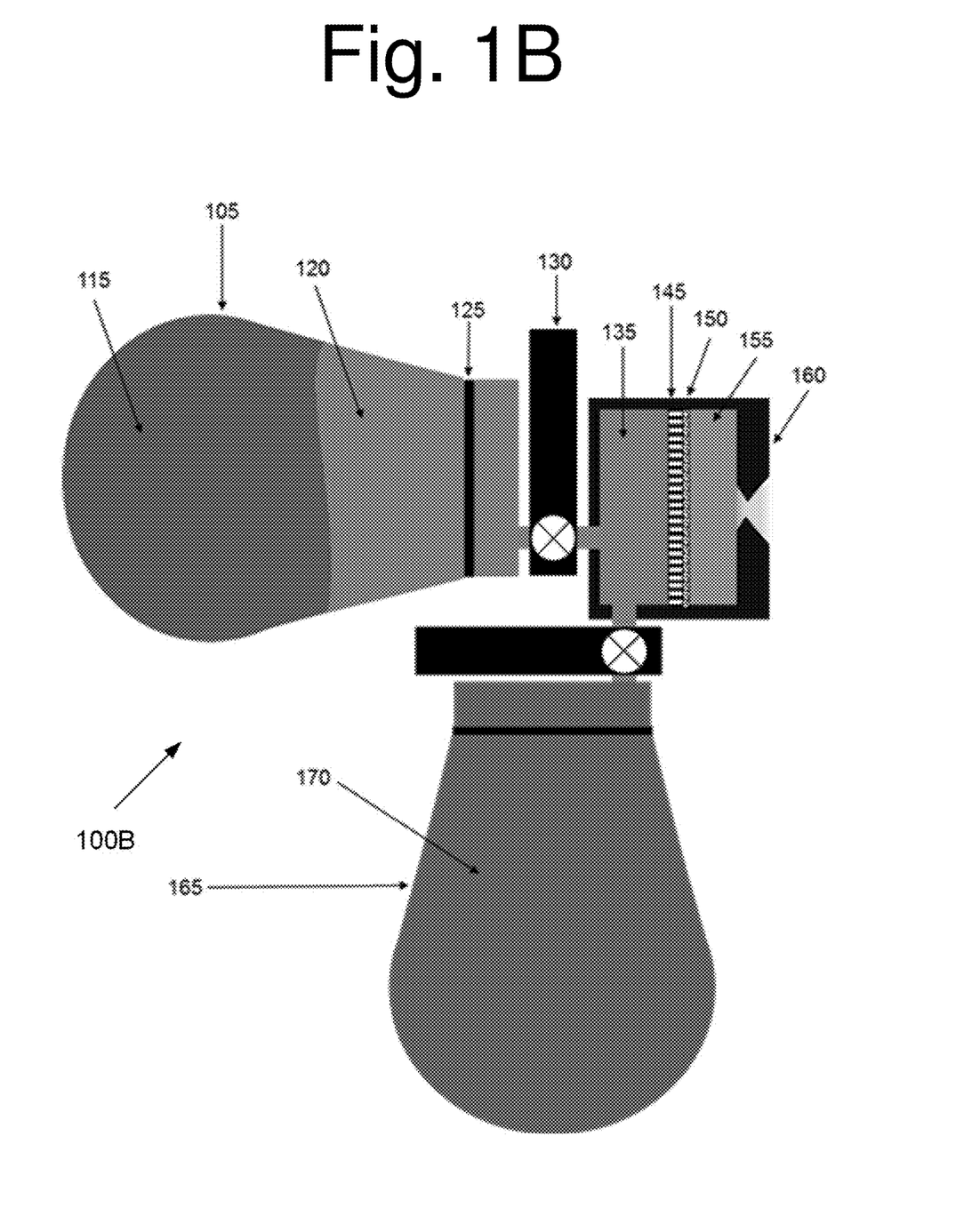

In some embodiments, the propulsion system may be utilized in a monopropellant design (FIG. 1A), and in other embodiments, the propulsion system may be utilized in a bipropellant design (FIG. 1B). The propulsion system does not require complex moving parts or expensive electric components that would otherwise be in, for example, an electrical propulsion system. The propulsion system does not require a separate pressure vessel for transmission of a high pressuring gas. More specifically, high pressuring gas is not required to push the vapor through the propulsion system.

In certain embodiments, the propulsion system may allow for green propellant options. This way, traditional hazardous propellants may not be required. These chemicals may include hydrazine, monomethyl hydrazine, and dinitrogen tetroxide. Hydrazine is a monopropellant currently employed on many satellites. While hydrazine has good performance, it presents a multitude of safety issues to personnel due to its corrosivity, toxicity, and carcinogenic properties. Monomethyl hydrazine (MMH) and dinitrogen tetroxide (N2O4) are often used in satellite bipropellant systems and have similar safety issues. Green propellants often have slightly lower performance but are normally much safer to handle and are normally better for the environment. Green propellants allow for more satellite manufacturers, without the funds, equipment, or skills to handle dangerous chemicals like hydrazine, to enter the market.

FIGS. 1A and 1B are diagrams illustrating a propulsion system 100A, 100B, according to an embodiment of the present invention. In some embodiments, propellant system 100A may include a monopropellant design, as shown in FIG. 1A. The monopropellant design may include a propellant tank 105, which includes liquid propellant 115 and natural vapor (hereinafter "vapor") 120 from liquid propellant 115. In other embodiments, small satellite propellant system 100B may include a bipropellant design, as shown in FIG. 1B. In the bipropellant design, an additional propellant tank 165 may be used. In such an embodiment, one tank would hold an oxidizer and the other tank would hold fuel. Propellant tank 165 in certain embodiments includes second propellant 170 that may be mixed with vapor 120 before passing through membrane 145.

Propellant tank 105 and propellant tank 165 may be printed in plastic or metal in some embodiments. Printing the tank may allow for more complex geometries that might be more difficult or expensive with traditional machining processes. In other embodiments, propellant tank 105 and propellant tank 165 may be constructed using typical machining processes. Propellant tanks 105, 165 might also be shaped to fit the available space on the spacecraft or be integrated with other components. Since propellant tanks 105, 165 may not hold more than atmospheric pressure, a specific shape may not be a requirement for the small satellite.

It should be appreciated that liquid propellant 115 may be stored in a liquid phase at ambient conditions, i.e., for simple, low pressure, and high density tanking. However, in other embodiments, liquid propellant 115 may be stored in cooler or warmer conditions. It might be beneficial to store liquid propellant 115 at cooler conditions to lower the vapor pressure or freeze the propellant for storage when not in use. Heating the propellant might prove beneficial for increasing vapor pressure.

For purposes of simplicity, the operation of the monopropellant thrust design will be explained below with the understanding that the bipropellant thrust design would operate in a similar manner.

As discussed above, the monopropellant thrust design includes a propellant tank 105. Propellant tank includes liquid propellant (or in certain embodiments a liquid oxidizer or fuel) 115 and vapor 120 that naturally sits on top of liquid propellant 115. In some embodiments, liquid propellant 115 may include, but is not limited to, hydrogen peroxide, hydrazine, isopropyl nitrate, nitromethane, nitrous oxide, and any other type of propellant that would be readily appreciated by a person of ordinary skill in the art. Liquid propellant 115 should have a reactive vapor phase. This means that salt-based propellants, such as hydroxylannonium nitrate (HAN) and AF-315, would not work with propulsion system 100A.

Generally, in a traditional propulsion system, pressurant gas pushes the liquid to, for example, a catalyst to create thrust. However, in propulsion system 100A, rather than pushing liquid to a catalyst, vapor 120 that naturally sits on top of liquid propellant 115 may flow from propellant tank 105 and through propulsion system 100A. Vapor 120 may react spontaneously on the reacting surface 150 or may require preheating reacting surface 150 before a reaction occurs. Reacting surface 150 in some embodiments may include a catalyst. As vapor 120 flows from propellant tank 105, liquid propellant 115 may continue to regenerate additional vapor 120 until all liquid propellant 115 is used.

It should be appreciated that a vacuum of space downstream of nozzle 160 may cause the flow of vapor 120. This is due to the pressure difference between propellant tank 105 and space. In some embodiments, the flow of vapor 120 may be viewed as vapor 120 being pulled from propellant tank 105 through propulsion system 100A for generating thrust. In other embodiments, the flow of vapor 120 may be viewed as vapor 120 being expanded from propulsion system 100A for generating thrust after interacting with reacting surface 150.

During operation, when a latching valve (or valve) 130 is opened, vapor 120 may begin to flow from propellant tank 105. Valve 130 in some embodiments is not only used for controlling the flow of vapor 120, but also used for safety on the launch pad, as well as for starting and stopping propulsion system 100A while in orbit.

To prevent liquid propellant 115 from flowing through propulsion system 100A, a liquid/vapor separation membrane 125 may be used. Liquid/vapor separation membrane 125 may separate liquid propellant 115 and the vapor 120. Should liquid propellant 115 flow through the propulsion system, liquid propellant 115 may block the flow of vapor 120 through membrane 145 and to reacting surface 150. For example, if the liquid were to flow through propulsion system 100A, and membrane 145 is completely blocked by liquid, negligible thrust would be generated. It should be appreciated that the liquid may not flow successfully through propulsion system 100A, due to the liquid's wetting action in membrane 145. This contact may inhibit flow of vapor 120 through small path areas of membrane 145.

In certain embodiments, small satellite propulsion system 100A may also include a propulsion management device 110 that guides liquid propellant 115 in one direction and vapor 120 in another direction. As shown in FIG. 1, lines are drawn showing propulsion management system 110, which are baffle(s) or fin(s), for example.

Figure 2A:
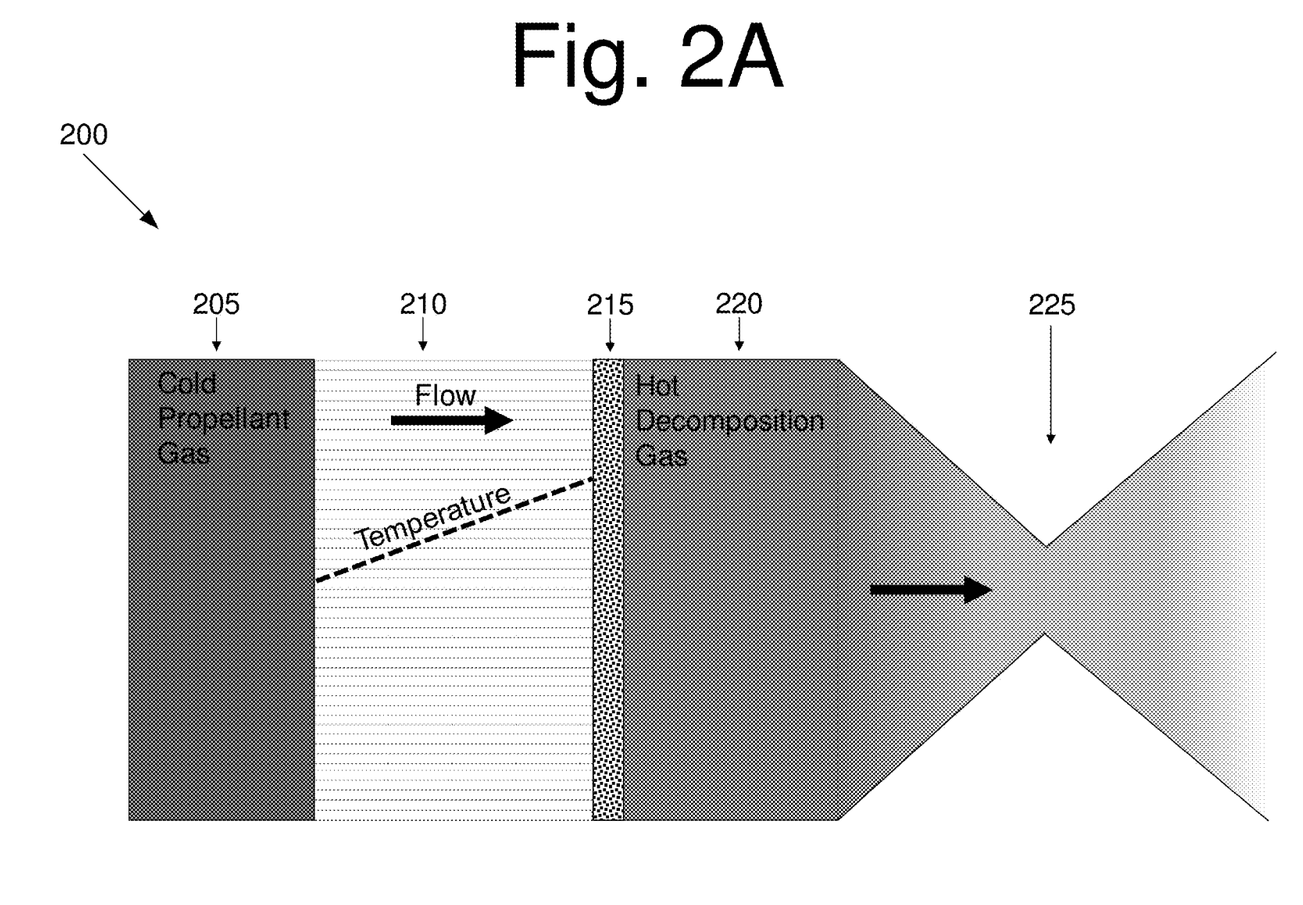
FIG. 2A is a diagram illustrating a behavior of vapor flowing through a membrane and reacting surface, according to an embodiment of the present invention.

FIG. 2A is a diagram 200 illustrating a behavior of vapor flowing through a membrane and a reacting surface, according to an embodiment of the present invention. More specifically, FIG. 2A shows the behavior of vapor downstream from valve 130 of FIG. 1A. In an embodiment, FIG. 2A shows a first chamber 205, which is the cold side, a membrane 210, a reacting surface 215, a second chamber 220, which is the hot side, and a converging, diverging nozzle 225. Membrane 210 may include a plurality of small pores or tubes. The diameter for each pore or tube may vary depending on the gas that is being pumped through, for example, propulsion system 100A. The size of the pore may control the flow rate of vapor to reacting surface 215. Simply put, the size of the pore may dictate the amount of vapor that flows through membrane 210. In other words, membrane 210 meters the flow rate of vapor to reacting surface 215, where vapor is decomposed resulting in hot gas downstream in chamber 220. In certain embodiments, membrane 210 may be made of a low thermal conductivity material to prevent heat flow back to first chamber 205.

In certain embodiments the membrane may be a thermal transpiration membrane, which would result in an increase in pressure of the vapor. See, for example, FIG. 2B. The thermal transpiration membrane would in some embodiments have pore diameters on the order of the gas mean free path.

Referring to FIG. 1A, for example, when propulsion system 100A is activated, the flow of vapor 120 through membrane 145 may be very slow, because there is not yet a temperature gradient within membrane 145. This may not occur in embodiments that do not use a thermal transpiration membrane. For example, in order for a thermal transpiration membrane to pump gas, a temperature gradient may be required in some embodiments. In those embodiments, the temperature gradient is established with vapor 120 reacting on the reacting surface.

Figure 2B:
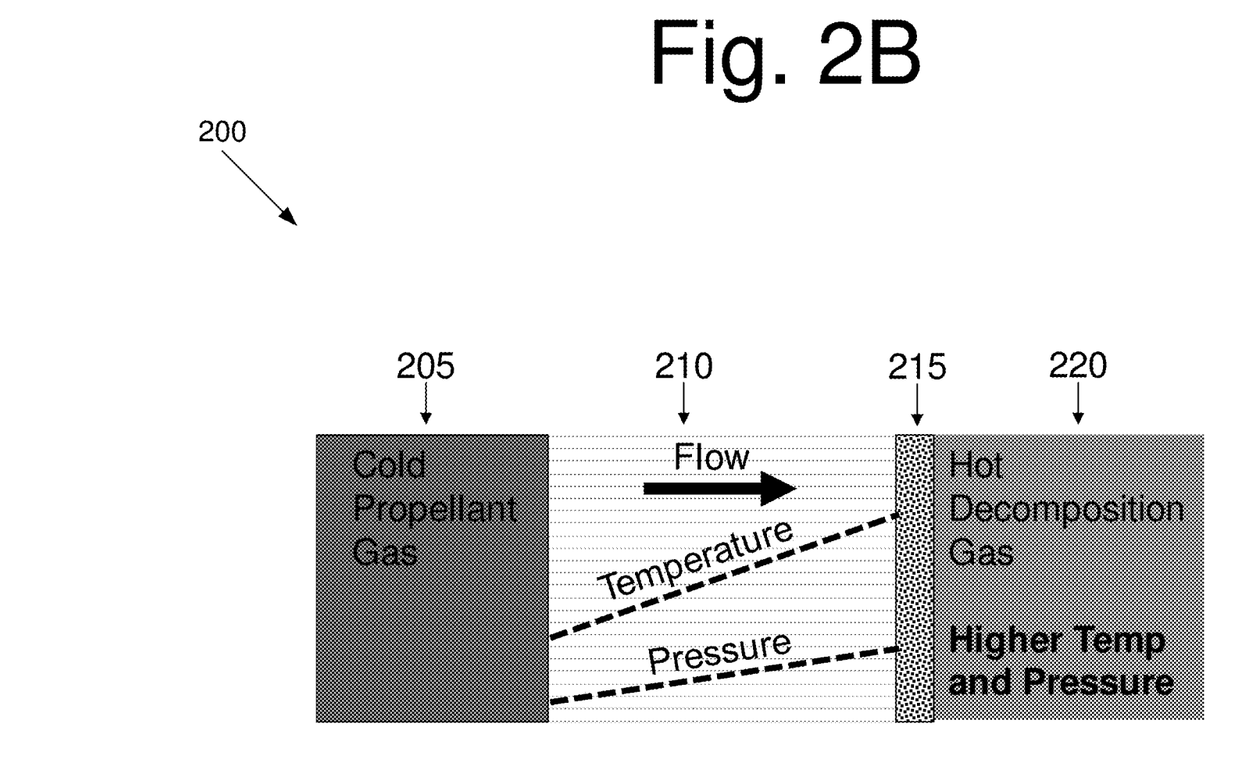
FIG. 2B is a diagram illustrating a behavior of vapor flowing through a thermal transpiration membrane and reacting surface, according to an embodiment of the present invention.

As shown in FIG. 2B, temperature may begin to increase due to reaction between the vapor and reacting surface 215. When this occurs, the flow rate of vapor through transpiration membrane 210 begins to increase due to thermal transpiration induced pumping and becomes steady. The steady flow of vapor through transpiration membrane 210 and the subsequent reaction on reacting surface 215 produces hot decomposition gases in second chamber 220. The hot decomposition of gases can then be forced out a nozzle, as shown in FIG. 2A, to generate thrust. It should be appreciated that unless valve 130 of FIG. 1A is closed, the flow of vapor 120 may continue to exist due to the vacuum near nozzle 160.

Using FIG. 1A as an example, if a higher flowrate is desired, valve 130 may be used instead of a membrane to meter the flowrate of vapor. In such an embodiment, membrane 145 of FIG. 1A may be removed and vapor 120 may interact directly with reacting surface 150. This might be suited for short pulses and higher vapor pressure propellants.

In certain embodiments, thermal management may be necessary to regulate heat transfer through the system. In those embodiments, thermal guard 140 may be placed between membrane 145 and the cold propellant gas (or vapor) in chamber 135. Thermal guard 140 may keep the propellant gas in chamber 135 thermally separated from the hot reacting surface 150. Thermal guard 140 may also be useful for maintaining a larger change in temperature, which is beneficial for embodiments utilizing a thermal transpiration membrane. Thermal guard 140 may be made of aluminum in some embodiments. To allow the propellant to flow easily through thermal guard 140, thermal guard 140 may be perforated or made of foam, for example.

To maintain a minimum temperature of the liquid propellant 115, a thermal connector 165 may be used to transfer heat from the hot side of the system, i.e., from chamber 155, back to propellant tank 105. Although FIG. 1A shows a thermal connector 165 connecting the hot side of the system to propellant tank 105, one of ordinary skill in the art would readily appreciate that other configurations and/or techniques may be used to transfer heat. This temperature regulation may be used to control the pressure of vapor 120. It should be appreciated that chamber 135 may be referred to as the "cold chamber" and chamber 155 may be referred to as "hot chamber".

Figure 3:
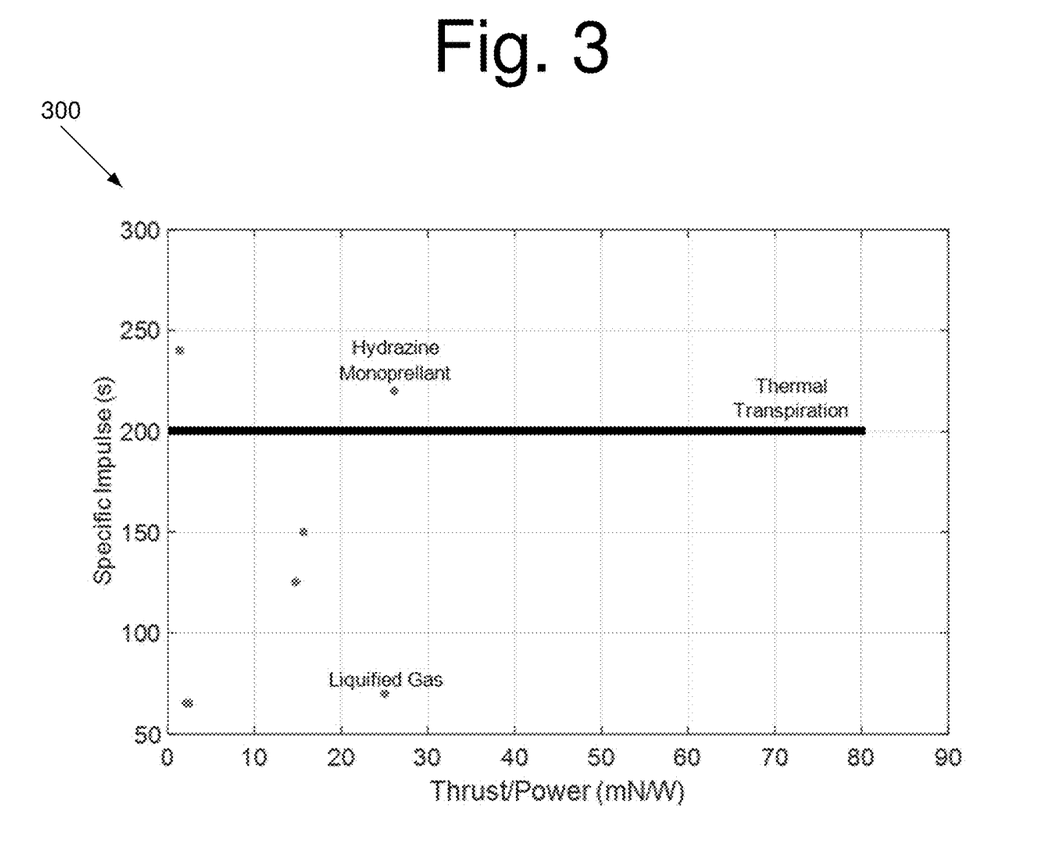
FIG. 3 is a graph illustrating theoretical performance comparison with other currently available small satellite propulsion systems, according to an embodiment of the present invention.

FIG. 3 is a graph 300 illustrating a theoretical performance comparison with other currently available small satellites propulsion systems and this system utilizing hydrogen peroxide and a thermal transpiration membrane, according to an embodiment of the present invention. Graph 300 shows a thrust over power performance comparison for propulsion systems with thrust/power>1. Therefore, extremely low thrust, high power systems are not shown since the high power systems are outside the bounds of the chart. The high power systems would mostly include electric systems. As can be seen, propellant system described herein can generate a much higher thrust/power than most available systems for small satellites, and also has the flexibility to perform within their ranges if desired.

Figure 4:
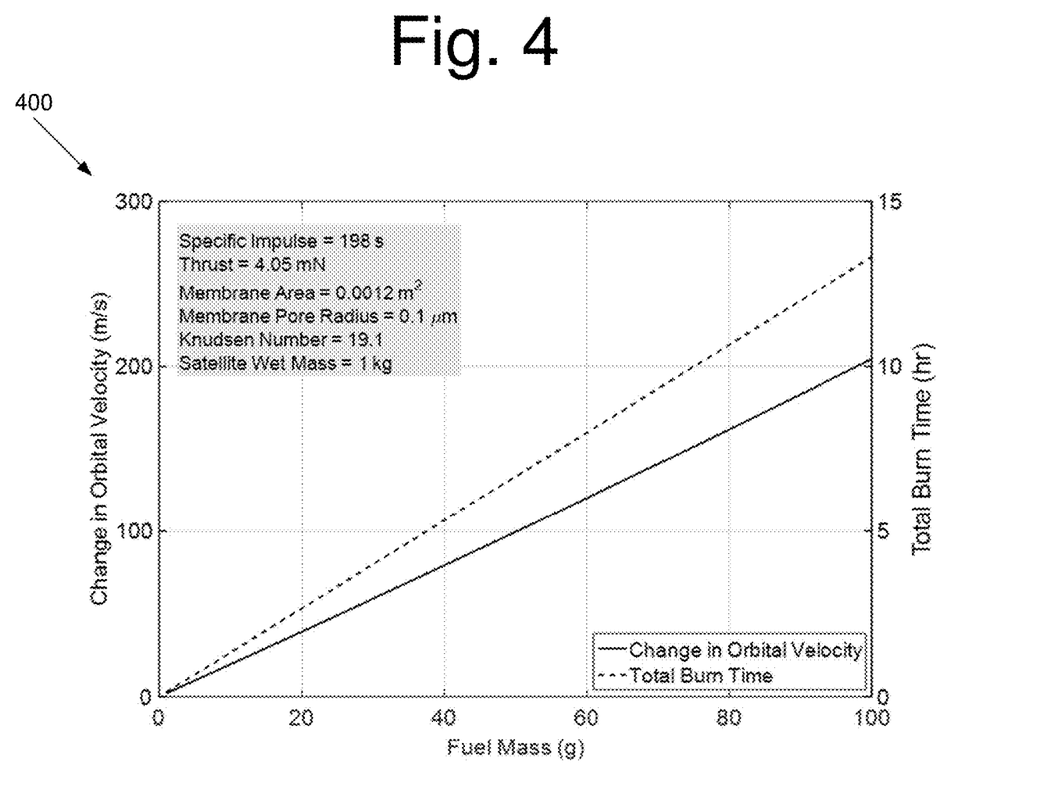
FIG. 4 is a graph illustrating a change in orbital velocity and burn time based on a specific thermal transpiration propulsion system using hydrogen peroxide, according to an embodiment of the present invention.

FIG. 4 is a graph 400 illustrating a theoretical orbital velocity change and burn time based on hydrogen peroxide loaded for a specific thermal transpiration propulsion system, according to an embodiment of the present invention. The amount of propellant loaded, and therefore, the mission orbital velocity change, can be altered as it is not fixed for some of the embodiments described herein. This allows for more mission control by the satellite manufacturer.

Figure 5:
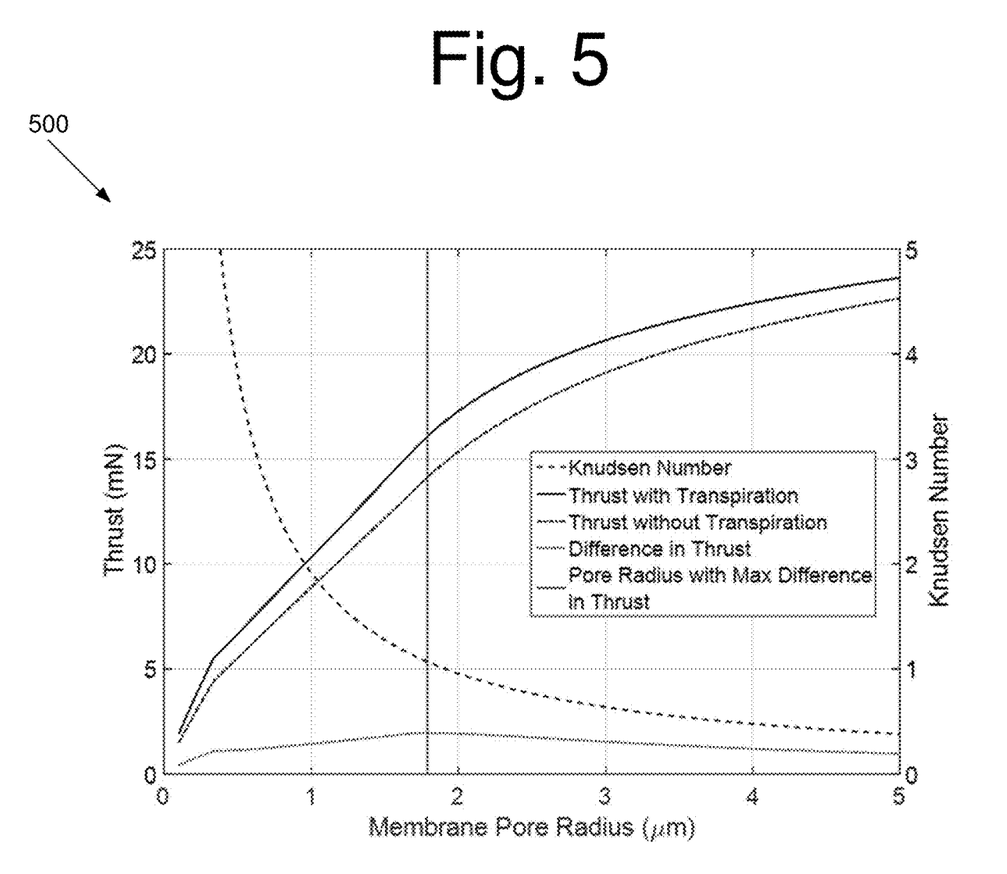
FIG. 5 is a graph illustrating thrust and Knudsen number based on membrane pore size in a small satellite propulsion system, according to an embodiment of the present invention.

FIG. 5 is a graph 500 illustrating theoretical thrust and Knudsen number based on membrane pore size in a small satellite propulsion system, according to an embodiment of the present invention. Graph 500 also shows the thrust benefits from using pumping membrane verses a non-pumping membrane of the same pore size (thermal transpiration verses non-thermal transpiration). The dotted line represents the membrane pore size generating the maximum difference in thrust between a non-pumping membrane and a pumping membrane.

Figure 6:
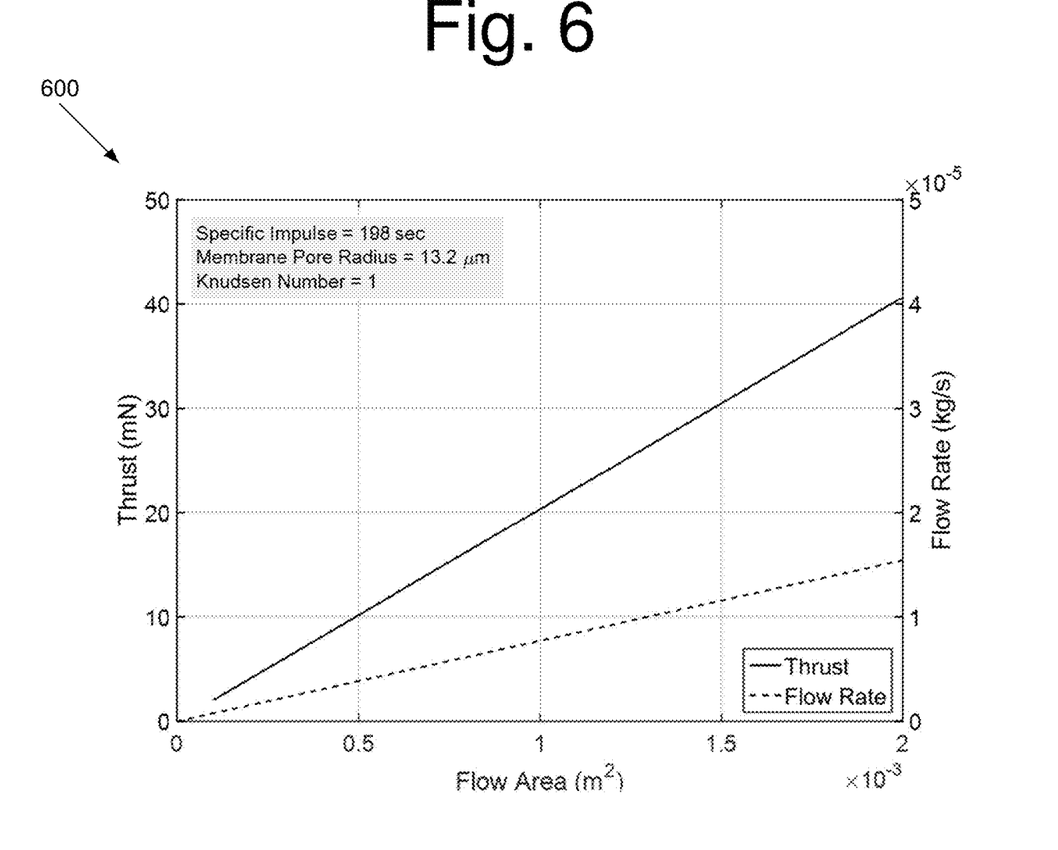
FIG. 6 is a graph illustrating thrust and flowrate based on membrane area, according to an embodiment of the present invention.

FIG. 6 is a graph 600 illustrating a theoretical thrust and flowrate based on membrane area, according to an embodiment of the present invention. In this illustration, graph 600 shows that as the area of the membrane is increased, more vapor is allowed to flow through the system. A higher flowrate can lead to higher thrust in certain embodiments.

One or more embodiments generally discuss a novel approach to generating thrust by using vapor that naturally sits on top of liquid propellant. In some embodiments, the liquid propellant may be stored in a liquid phase. However, in other embodiments, the liquid propellant may be stored in a frozen state, and may be heated at a later time or allowed to be thawed or sublime over time.

The propulsion system may enable a small satellite, such as a CubeSat, to perform orbit changes, extend the life of the mission, perform rendezvous, perform formation flying, and any other movement once placed in orbit. The propulsion system may have low pressure, low power, and low complexity. The propulsion system may also work with a variety of propellants that have a reactive vapor phase and may be stored in a liquid or solid state.

The propulsion system may include a transpiration membrane having a pore size that can be manipulated to provide a range of thrust options. Multiple stages of thermal transpiration may lead to a higher chamber pressure, leading to a higher thrust and performance The propulsion system may incorporate solid oxide fuel cells (SOFC) that can lead to power generation. SOFCs may cause the system to generate small amounts of power while running, which can be stored for later use. The SOFC(s) in some embodiments would be placed in the propellant(s) vapor path.

It will be readily understood that the components of various embodiments of the present invention, as generally described and illustrated in the figures herein, may be arranged and designed in a wide variety of different configurations. Thus, the detailed description of the embodiments of the systems, apparatuses, methods, and computer programs of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. An apparatus, comprising:
   a propellant tank comprising liquid propellant with a reactive vapor phase,
   a catalyst located downstream of the propellant tank along a vapor flow path, wherein
   the propellant tank is configured to be selectively exposed to the pressure of space, generating a pressure differential causing a flow of vapor from the propellant tank and through a valve, a membrane, a collection of tubes, or a combination thereof,
   to interact with the catalyst to generate thrust while maintaining the liquid propellant in the propellant tank; and
   a propellant management device configured to prevent the liquid propellant from escaping the propellant tank and propagating through the apparatus.

2. The apparatus of claim 1, wherein the liquid propellant continuously generates the reactive vapor phase until the liquid propellant is exhausted.

3. The apparatus of claim 1, further comprising:
   a separation membrane configured to prevent the liquid propellant from escaping the propellant tank and propagating through the apparatus.

4. The apparatus of claim 1, wherein the apparatus further includes the valve,
   the valve controls the flow of the reactive vapor phase from the propellant tank to the catalyst.

5. The apparatus of claim 1, wherein the apparatus further includes the membrane,
   the membrane comprises a plurality of pores to control the flow of the reactive vapor phase to the catalyst.

6. The apparatus of claim 5, wherein the flow of the reactive vapor phase is dependent on a size of each of the plurality of pores.

7. The apparatus of claim 1, wherein the apparatus further includes the membrane, the membrane comprises a thermal transpiration membrane.

8. The apparatus of claim 1, wherein the apparatus further includes the collection of tubes, the collection of tubes is proximate to the
   catalyst and controls the flow of reactive vapor phase from the propellant tank to the catalyst.

9. The apparatus of claim 1, wherein the interaction of the reactive vapor phase and the catalyst generates high temperature gas.

10. The apparatus of claim 1, wherein the apparatus further includes the membrane, the apparatus further comprising:
    a thermal guard placed between the membrane and a cold chamber to maintain the reactive vapor phase in the cold chamber thermally separated from the catalyst.

11. The apparatus of claim 1, further comprising:
    a thermal connector transferring heat from a hot chamber to the propellant tank to maintain a minimum temperature of the liquid propellant and control pressure of the vapor.

12. An apparatus, comprising:
    a first propellant tank comprising liquid propellant having a reactive vapor phase;
    a catalyst located downstream of the propellant tank along a vapor flow path;
    a valve, when open, causes the reactor vapor phase to be pulled from the first propellant tank and flow through a membrane to interact with the catalyst to generate thrust, wherein the first propellant tank is configured to be selectively exposed to the pressure of space, generating a pressure differential causing a flow of vapor from the first propellant tank and through the valve, the membrane, a collection of tubes, or a combination thereof, to interact with the catalyst to generate thrust while maintaining the liquid propellant in the first propellant tank; and
    a propellant management device configured to prevent the liquid propellant from escaping the first propellant tank and propagating through the apparatus.

13. The apparatus of claim 12, wherein the liquid propellant continuously generates the reactive vapor phase until the liquid propellant is exhausted.

14. The apparatus of claim 12, further comprising:
    a separation membrane configured to prevent the liquid propellant from escaping the propellant tank and propagating through the apparatus.

15. The apparatus of claim 12, wherein the membrane comprises a thermal transpiration membrane.

16. The apparatus of claim 15, wherein the membrane comprises a plurality of pores to control the flow of the reactive vapor phase to the catalyst.

17. The apparatus of claim 16, wherein each of the plurality of pores comprises a diameter that is dependent upon the reactive vapor phase flowing through the apparatus.

18. The apparatus of claim 16, wherein the flow of the reactive vapor phase is dependent on a size of each of the plurality of pores.

19. The apparatus of claim 12, wherein reactive vapor phase flowing from the first propellant tank interacts with the catalyst to produce a hot decomposition of gases.

20. The apparatus of claim 12, wherein the reactive vapor phase flowing from the first propellant tank is due to the vacuum of space proximate to the nozzle, resulting in the pressure differential.

21. The apparatus of claim 12, further comprising:
a second tank comprising a second propellant, the second propellant flows from the second propellant tank and is mixed with the reactive vapor phase prior interacting with the catalyst.

22. The apparatus of claim 12, further comprising:
a thermal guard placed between the membrane and a cold chamber to maintain the reactive vapor phase in the cold chamber thermally separated from the catalyst.

23. An apparatus, comprising:
a first propellant tank comprising liquid propellant having a reactive vapor phase;
a catalyst located downstream of the first propellant tank along a vapor flow path;
a second propellant tank comprising a second propellant, wherein
the reactive vapor phase and the second propellant is mixed prior to passing through a membrane, and
the first propellant tank is configured to be selectively exposed to the pressure of space, generating a pressure differential causing a flow of vapor from the first propellant tank and through a valve, the membrane, a collection of tubes, or a combination thereof, to interact with the catalyst to generate thrust while maintaining the liquid propellant in the first propellant tank; and
a propellant management device configured to prevent the liquid propellant from escaping the first propellant tank and propagating through the apparatus.

24. An apparatus, comprising:
a first propellant tank comprising liquid propellant having a reactive vapor phase with a vapor pressure of less than 1 atmosphere at 25 degrees Celsius;
a second propellant tank comprising a second propellant, wherein
the reactive vapor phase and the second propellant is mixed prior to passing through a membrane, and
the reactive vapor phase is pulled without pulling or pushing the liquid propellant from the first propellant tank and through a valve and the membrane by way of a pressure differential, the pressure differential being generated between the vapor pressure of the propellant and space; and
a propellant management device configured to prevent the liquid propellant from escaping the propellant tank and propagating through the apparatus.

* * * * *